May 3, 1966   G. E. FORD   3,248,851
APPARATUS FOR SEALING THERMOPLASTIC BOTTLES
Filed Oct. 4, 1962
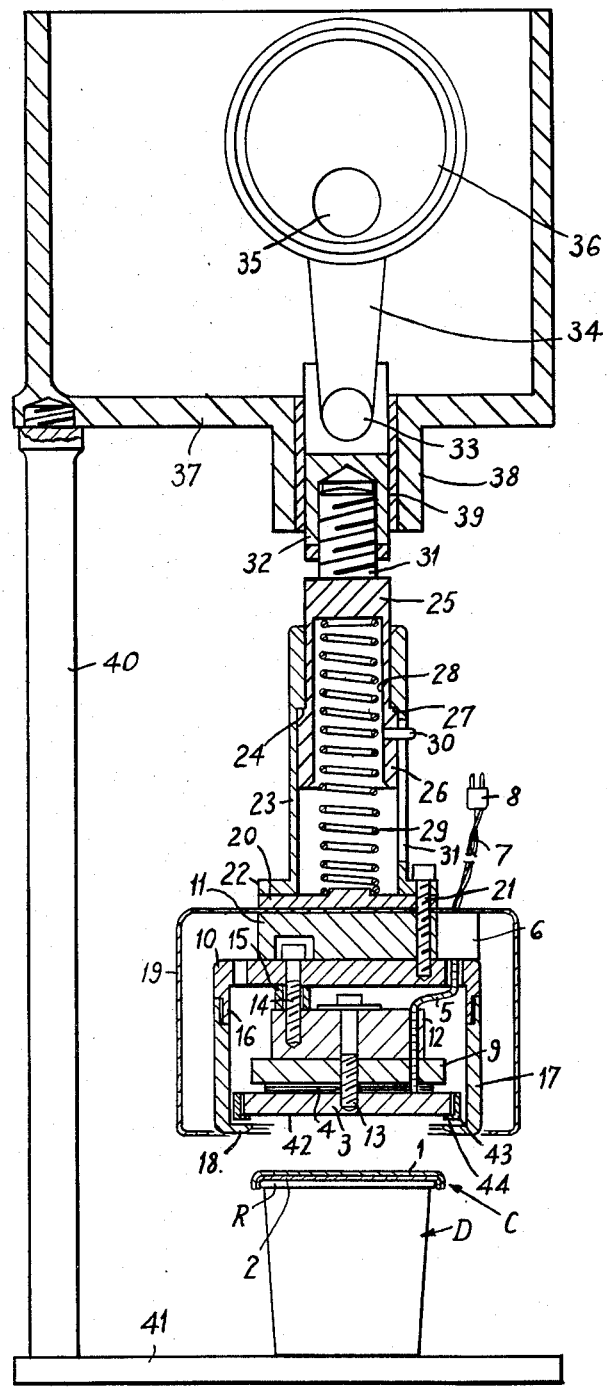
Inventor
G. E. Ford
By
Attorneys

United States Patent Office 3,248,851
Patented May 3, 1966

3,248,851
APPARATUS FOR SEALING THERMO-
PLASTIC BOTTLES
Geoffrey Ewart Ford, Bedford, England, assignor to
Fords (Finsburry) Limited, Kempston, England, a
British Company
Filed Oct. 4, 1962, Ser. No. 228,443
Claims priority, application Great Britain, Oct. 5, 1961,
35,888/61
1 Claim. (Cl. 53—373)

The present invention relates to the sealing of containers, for example bottles or jars, which are made from or have at least a rim formed from, a synthetic organic thermoplastic material, for example polythene.

It is an object of the present invention to seal such a container with a cap having a lining of a synthetic organic thermoplastic material.

Another object of the invention is to provide a sealing device for sealing caps of this nature onto containers of the kind in question.

To this end, the invention provides a method of sealing a cap having a lining of a synthetic organic thermoplastic material secured to the inside thereof, onto a container having at least a cap-receiving rim made from a material interfusible with the material of said lining, which comprises applying heat and pressure between said cap and said rim to fuse said lining to said rim.

The invention also provides a cap for sealing a bottle, at least the cap-receiving rim of which is made from a synthetic organic thermoplastic material, said cap comprising an outer layer secured thereto and made from a material interfusible with the material of said container.

The invention also provides a sealing device for sealing a cap having a lining of a synthetic organic thermoplastic material to a container having at least a rim thereof made from a material interfusible with the material of said lining, comprising an electrical heating platen, means for controlling the temperature of said platen to a temperature not in excess of the softening temperature of the interfusible materials, a support plate for said platen, means for mounting said support plate on a device for axially moving said support plate and said platen, and a thermal barrier means between said support plate and said platen.

In order that the invention may be more clearly understood, reference will now be made to the accompanying drawing which shows a side view of a sealing device in cross-section and largely schematically.

Referring to the drawing, there is shown a sealing device for sealing a cap C that comprises an outer layer of metal foil 1 to the inside of which is secured a layer 2 of a synthetic organic thermoplastic material, to a container D at least the rim R of which is made from a synthetic organic thermoplastic material interfusible with the material 2. Generally the whole of the container D would be made from the thermoplastic material, and it may have any desired shape such as a jar, bottle, pot or flask, for example. Similar synthetic organic thermoplastic materials are generally interfusible and it has been found that polythene works very well. However any materials may be used which are found to be interfusible on the application of heat and pressure.

The sealing device comprises an electrically heated platen 3 having heating elements schematically illustrated at 4 and fed with electric current by leads 5 from a temperate controlling device or thermostat schematically illustrated at 6. The device 6 may take any desired form and is well known in the art and therefore does not need to be more fully illustrated. The device 6 is provided with leads 7 so that the heating elements may be connected to a suitable source of electrical power for which purpose the leads 7 are terminated in a suitable plug schematically illustrated at 8. The device is set or adjusted so that the heating elements 4 do not attain a temperature in excess of the softening temperature of the materials to be interfused.

Above the heating elements 4 is a support plate 9 and the support plate is suspended from a mounting means that comprises a plate 10 and a boss 11 with the interposition of a thermal barrier 12 which is in the form of a block of a material which is a poor conductor of heat, for example asbestos or ceramic. The thermal barrier 12 is connected to the support plate 9 and the platen 3 by means of screws, one of which is shown at 14. In order to space the plate 10 from the thermal barrier 12 to allow space for the heads of the screws 13, the screws 14 may pass through tubular distance pieces 15.

The plate 10 has a downwardly dependent flange 16 to which is screwed a collar 17 having an inturned lip 18.

The assembly just described is enclosed within a heat shield 19 which is clamped at the centre of its upper face between the boss 11 and an upper support plate 20 by means of a plurality of screws, one of which is shown at 21. The purpose of this shield is to reflect heat downwardly towards the platen 3. The screws 21 also pass into the plate 10 and their heads rest on a flange 22 projecting outwardly from a sleeve member 23 provided with an inner annular shoulder 24.

Mounted within the sleeve 23 is a shaft 25 having a thickened lower portion 26 and an annular shoulder 27 to limit relative movement between the sleeve 23 and the shaft 25 in one direction, as shown in the drawing. Between a bore 28 in the shaft 25 and the support plate 20 is provided a compression spring 29. The shaft 25 also has an outwardly projecting peg 30 which passes through a slot 31 in the sleeve 23 to prevent rotation between the sleeve and the assembly supported therefrom, and the shaft 25.

At its upper end the shaft 25 is provided with a threaded extension 31 screwed into a connecting block 32 that forms a gudgeon bearing 33 for a crank 34 eccentrically connected by a pin 35 to a driving wheel 36. The driving wheel 36 is driven by suitable means (not shown) which may take any desired form and does not form part of the present invention. For example, the wheel 36 may be driven by an electric motor (not shown).

A mounting box 37 houses the driving wheel 36 and has a downwardly extending tubular projection 38 through which the connecting block 32 passes, a bearing sleeve 39 being provided between the parts. The mounting box 37 is supported by a pillar 40 secured to a base 41 upon which the containers D are located for sealing.

In use, a container D is placed under the sealing device with a cap C in position. The motor or other drive means is operated to bring the heated platen 3 down into contact with the cap C, the pressure being controllable by the strength of spring 29. It will be seen that initial contact between platen 3 and cap C will compress spring 29 until it is fully compressed. The heat and pressure soften the interface of the contacting materials so that they interfuse, thus sealing the cap to the container. The bond is so strong that to remove the cap it is necessary to tear it from the container.

The sealing device is preferably automated by providing means for feeding capped containers in succession to and away from the sealing device, the shaft being operated in timed relation with the input feed of the containers. For example a conventional star-wheel feed in conjunction with input and output conveyor may be used, the drive for the shaft 25 being synchronised with the drive for the conveyor and star-wheel. A convenient way of effecting this timed relationship is to provide a common drive motor for all the parts working in synchrony.

With the device described above it may happen that the platen 3 can stick to the metal foil 1 of the cap C, and to prevent this the platen 3 may be provided with a layer 42 of polytetrafluorethylene which is held in place by a screwed collar 43 secured to the periphery of the platen 3 and having an internal lip 44.

Whilst, in the embodiment described above the platen is moved towards the container, it will be understood that if desired the container may be pushed upwardly against a fixed platen.

I claim:

A sealing device for sealing a cap having a lining of a synthetic organic thermoplastic material to a container having at least a rim thereof made from a material interfusible with the material of said lining, comprising an electrical heating platen, means for controlling the temperature of said platen to a temperature not in excess of the softening temperature of the interfusible materials, a support plate for said platen, means for mounting said support plate on a device for axially moving said support plate and said platen, said moving device comprising a shaft connected to a reciprocating drive arrangement, spring means between said shaft and said mounting means, a sleeve connected to said mounting means and surrounding said spring means and part of said shaft, and stop means between said shaft and said sleeve to limit relative axial movement between said sleeve and said shaft in one direction, and a thermal barrier means between said support plate and said platen.

References Cited by the Examiner

UNITED STATES PATENTS

| | | | |
|---|---|---|---|
| 2,620,427 | 12/1952 | Mickel | 219—243 |
| 2,638,964 | 5/1953 | Andina | 107—8 |
| 2,649,392 | 8/1953 | Marshall | 53—39 |
| 2,651,350 | 9/1953 | Casey et al. | 156—583 |
| 2,738,407 | 3/1956 | Dupont | 219—243 X |
| 3,009,304 | 11/1961 | Swick | 53—373 |
| 3,019,583 | 2/1962 | Sylvester et al. | 53—373 |
| 3,088,643 | 5/1963 | Dunn | 229—1.5 |
| 3,090,537 | 5/1963 | Pasciak | 229—1.5 |
| 3,119,216 | 1/1964 | Held | 53—39 |

FRANK E. BAILEY, *Primary Examiner.*

TRAVIS S. McGEHEE, *Examiner.*